United States Patent
Murphy (10) Patent No.: US 6,515,834 B1
(45) Date of Patent: Feb. 4, 2003

(54) SIDE-ARM MICROACTUATOR WITH PIEZOELECTRIC ADJUSTER

(75) Inventor: James Morgan Murphy, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/502,268

(22) Filed: Feb. 11, 2000

Related U.S. Application Data (60) Provisional application No. 60/124,552, filed on Mar. 16, 1999.

(51) Int. Cl.$^7$ .................................................. G11B 5/56
(52) U.S. Cl. ............................. 360/294.4; 360/264.5; 360/246.7
(58) Field of Search ........................... 360/294.3, 294.1, 360/294.2, 294.4, 294.6, 264.5, 246.7; 310/328, 323.17, 67 R, 51, 22, 36

(56) References Cited

U.S. PATENT DOCUMENTS 6,233,124 B1 * 5/2001 Budde et al. ............ 360/294.4
6,268,983 B1 * 7/2001 Imada et al. ............. 360/294.3
6,327,120 B1 * 12/2001 Koganezawa et al. ...... 310/311

\* cited by examiner

Primary Examiner—Brian E. Miller
Assistant Examiner—Tianjie Chen
(74) Attorney, Agent, or Firm—Kinney & Lange, P.A.

(57) ABSTRACT

A microactuation system selectively alters a position of a transducing head carried by a slider in a disc drive system with respect to a track of a rotatable disk having a plurality of concentric tracks. The disc drive system includes a load beam and a base for attachment to an actuator arm and a suspension for supporting the slider over the rotatable disc. The microactuation system includes a piezoelectric element attached between the actuator arm and the load beam and a beam connecting a stationary portion of the load beam to a moving portion of the load beam. The piezoelectric element is deformable in response to a voltage applied thereto. The beams are sufficiently compliant to permit movement of the moving portion of the load beam with respect to the stationary portion of the load beam upon deformation of the piezoelectric element.

19 Claims, 7 Drawing Sheets

SIDE-ARM MICROACTUATOR WITH PIEZOELECTRIC ADJUSTER

CROSS-REFERENCE TO RELATED APPLICATION(S)

This application claims priority from provisional application number 60/124,552, filed Mar. 16, 1999 for "Side-Arm Microactuator" by James Morgan Murphy.

BACKGROUND OF THE INVENTION

The present invention relates to a suspension-level microactuator having an improved stroke length. More particularly, it relates to a microactuator located between a suspension and an actuator arm in a disc drive system having piezoelectric elements to selectively move a transducing head radially with respect to a rotatable disc.

Disc drive systems include disc drive suspensions for supporting transducing heads over information tracks of a rotatable disc. Typically, suspensions include a load beam having a mounting region on a proximal end, a flexure on a distal end, a relatively rigid region adjacent to the flexure, and a spring region between the mounting region and the rigid region. An air bearing slider which holds the transducing head is mounted to the flexure. The mounting region is typically attached to a base plate for mounting the load beam to an actuator arm. A motor which is controlled by a servo control system rotates the actuator arm to position the transducing head over the desired information tracks on the disc. This type of suspension is used with both magnetic and non-magnetic discs.

The density of concentric data tracks on magnetic discs continues to increase (i.e., the size of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a slider at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising design for high resolution head positioning involves employing a high resolution microactuator in addition to the conventional low resolution actuator motor, thereby effecting head positioning through dual-stage actuation. Various microactuator designs have been considered to accomplish high resolution head positioning. These designs, however, all had shortcomings that limited the effectiveness of the microactuator. Many designs increased the complexity of designing and assembling the existing components of the disc drive, while other designs were unable to achieve the force and bandwidth necessary to accommodate rapid track access. Therefore, the prior designs did not present ideal microactuator solutions. More recent microactuator designs employ electroactive elements to effect movement of the suspension with respect to the actuator arm. This technique has proven effective but suffers from a small range of motion.

The positioning of a transducing head through dual-stage actuation using electroactive elements has been disclosed in prior patent applications. One such application is U.S. patent application Ser. No. 09/311,086 filed May 13, 1999 by Budde et al. entitled "PIEZOELECTRIC MICROACTUATOR SUSPENSION ASSEMBLY WITH IMPROVED STROKE LENGTH," which is assigned to Seagate Technology, Inc., the assignee of the present application and is hereby incorporated by reference. There remains a need in the art, however, for an electroactive element microactuator design that provides efficient high resolution head positioning in a dual-stage actuation system and allows for a greater range of motion than current designs.

BRIEF SUMMARY OF THE INVENTION

The present invention is a microactuator for selectively altering a position of a transducing head carried by a slider in a disc drive system with respect to a track of a rotatable disc having a plurality of concentric tracks. The microactuator includes an actuator arm for attachment to a suspension. The suspension supports the slider over the rotatable disc. The microactuator includes a first electroactive element and a first beam attached between the actuator arm and the suspension. The first electroactive element is deformable in response to an electrical control signal applied thereto. The first beam is flexible to permit movement of the head suspension with respect to the actuator arm.

DETAILED DESCRIPTION

Figure 1:
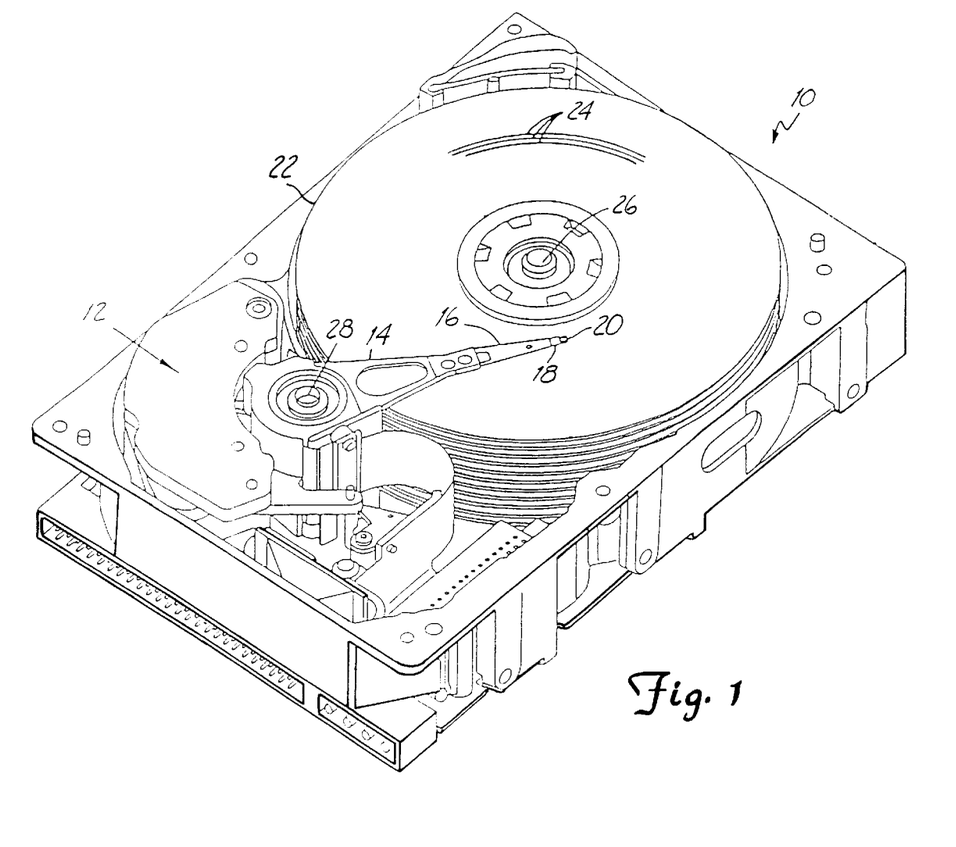
FIG. 1 is perspective view of a disc drive system including an actuation system for positioning a slider over tracks of a disc.

FIG. 1 shows a top view of a disc drive actuation system 10, as known in the prior art, for positioning a transducing head (not shown) over a track of a magnetic disc. The actuation system 10 includes, as shown from left to right in FIG. 1, a voice coil motor (VCM) 12, an actuator arm 14, a suspension 16, a flexure 18, and a slider 20. The slider 20 is connected to the distal end of the suspension 16 by the flexure 18. The suspension 16 is connected to the actuator arm 14 which is coupled to the VCM 12.

As shown on the right side of FIG. 1, the disc drive assembly includes a disc 22 having a multiplicity of tracks 24 which rotate about an axis 26. During operation of the disc drive assembly, the rotation of the disc 22 generates air movement which is encountered by the slider 20. This air movement acts to keep the slider 20 aloft a small distance above the surface of the disc 22 allowing the slider 20 to "fly" above the surface of the disc 22. Any wear associated with physical contact between the slider 20 and the disc 22 is thus minimized.

The flexure 18 provides a spring connection between the slider 20 and the suspension 16. Flexure 18 is configured such that is allows the slider 20 to move in pitch and roll directions to compensate for fluctuations in the spinning surface of the disc 22. Many different types of flexures 18, also known as gimbals, are known to provide the spring connection allowing for pitch and roll movement of the slider 20 and can be used with the present invention.

The VCM 12 is selectively operated to move the actuator arm 14 around an axis 28 thereby moving the suspension 16 and positioning the transducing head (not shown) carried by the slider 20 between tracks 24 of disc 22. Proper positioning of the transducing head (not shown) is necessary for reading and writing of data on the concentric tracks 24 of the disc 22. For a disc 22 having a high density, however, the VCM 12 lacks sufficient resolution and frequency response to position the transducing head (not shown) on the slider 20 over a selected track 24 of the disc 22. Therefore, a higher resolution microactuation system is used.

Figure 2A:
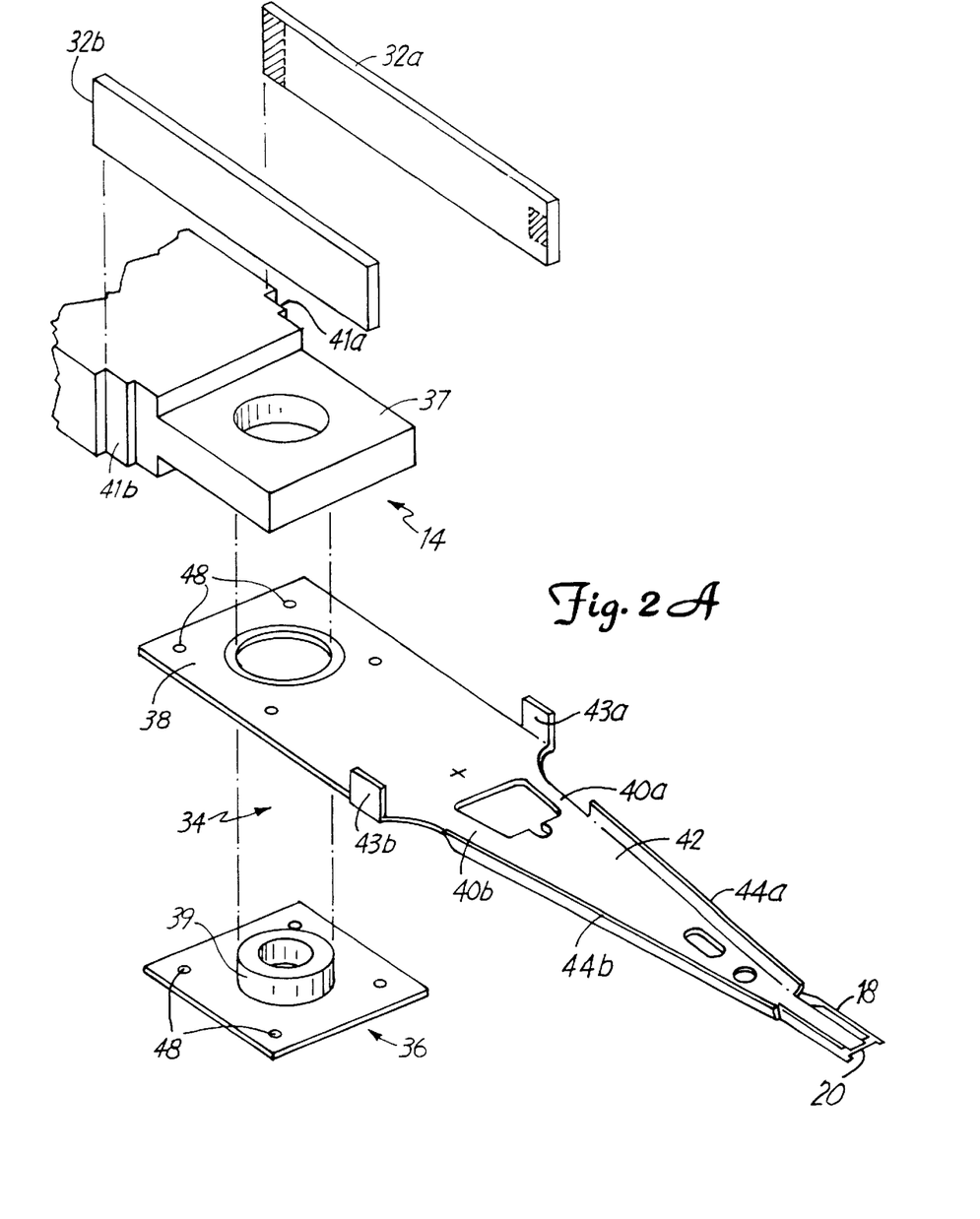
FIG. 2A is an exploded perspective view of a microactuation system for use in a dual-stage disc drive actuation system for high resolution positioning of a slider according to the present invention.
Figure 2B:
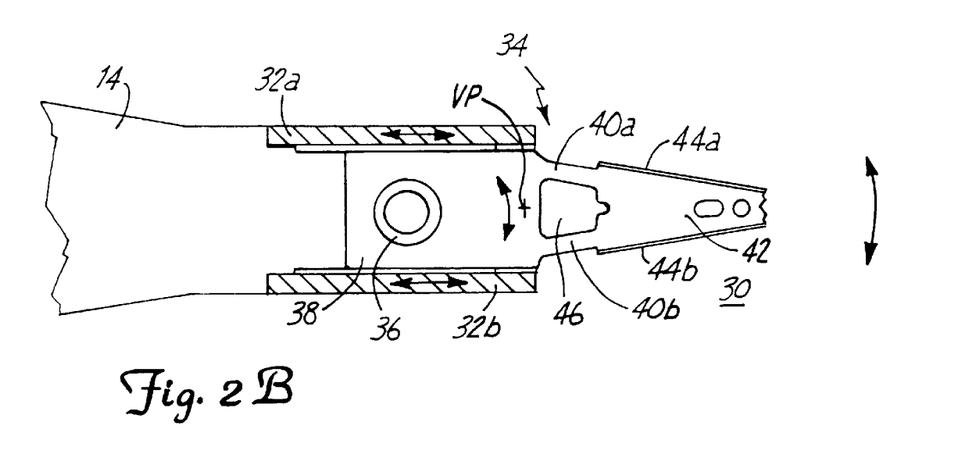
FIG. 2B is a top view of the microactuation system shown in FIG. 2A.

FIG. 2A is an exploded perspective view, and FIG. 2B is a top view, of a microactuation system 30 for use in a dual-stage disc drive actuation system for high resolution positioning of a transducing head (not shown) according to the present invention. FIGS. 2A and 2B illustrate a generic embodiment of the present invention wherein the specific structures for allowing pivotal or rotational movement of the suspension 16 with respect to the actuator arm 14 are not shown. The specific structures employed will be disclosed at a later point in the specification. Absent these pivotal or rotational structures, the device shown will not function effectively. FIGS. 2A and 2B are intended to illustrate the general technique employed by the present invention to improve performance of the dual-stage disc drive actuation system.

As shown from top to bottom in FIG. 2A, the microactuation system 30 includes two piezoelectric elements 32a and 32b, the actuator arm 14, a load beam 34, and a base plate 36. The actuator arm 14 has an arm tip 37, having a hole running generally through its center, located at its distal end. The base plate 36 has a swage boss 39 that acts to couple the load beam 34 to the arm tip 37 of the actuator arm 14. The swage boss 39 is inserted through a hole in the load beam 34 and into the opening in the arm tip 37. The base plate 36 is then swaged to the actuator arm 14. As shown in FIG. 2A, the load beam 34 is attached to a bottom surface of the arm tip 37 by the base plate 36. Generally, a second load beam 34 is attached to a top surface of the arm tip 37 by a second base plate 36. The two piezoelectric elements 32a, 32b are attached to the load beam 34 and actuator arm 14 as explained in greater detail below. The two piezoelectric elements 32a, 32b, the load beam 34, and the base plate 36 are all components of the suspension 16 as illustrated in FIG. 1.

As shown in FIGS. 2A and 2B, moving from left to right, or from a proximal end to a distal end, the load beam 34 includes a mounting region 38, two pre-load bend legs 40a, 40b, and a head suspension 42. The head suspension 42 is flexibly coupled to the mounting region 38 by the two pre-load bend legs 40a and 40b. As best shown in FIG. 2B, the piezoelectric elements 32a, 32b connect at a first end to the mounting steps 41a, 41b on the actuator arm 14 and, at a second end, to the mounting region 38 of the load beam 34.

In a first preferred embodiment, the piezoelectric elements 32a, 32b are disposed orthogonally with respect to the actuator arm 14 and the mounting region 38, as illustrated in FIG. 2A. In other words, the piezoelectric elements 32a, 32b are disposed such that their width dimension lies in a plane normal to the general plane of the load beam 34. In a second preferred embodiment, the piezoelectric elements 32a, 32b are disposed in generally the same plane as the actuator arm 14 and the mounting region 38. In other words, the piezoelectric elements 32a, 32b are disposed such that their width dimension lies in a plane parallel to the general plane of the load beam 34.

In the first preferred embodiment, the piezoelectric elements 32a, 32b are mounted on a first end to an outside surface of the mounting tabs 43a, 43b located on the mounting region 38 and, on a second end, to the mounting steps 41a, 41b of the actuator arm 14. The orthogonal configuration, shown in FIG. 2A, offers several advantages. It allows thicker or multilayer piezoelectric elements 32a, 32b to be used because the available space is not restricted by the presence of the disc 22. This provides for a greater stroke length of the piezoelectric elements 32a, 32b. Also, in a disc drive system having multiple suspensions 16 disposed one on top of another, this configuration facilitates using the piezoelectric elements 32a, 32b to drive two suspensions 16 at the same time. In FIGS. 3–9, the piezoelectric elements 32 are thicker or multilayer elements shown in the orthogonal configuration. It is important to note, however, that in each of these figures the piezoelectric elements 32 could be mounted in the parallel configuration discussed above.

The head suspension 42, which is located on the right side of FIG. 2B, includes two edge rails 44a, 44b. The edge rails 44a, 44b are located on transversely opposite sides of the head suspension 42 and provide stiffness to that element. The pre-load bend legs 40a, 40b, shown near the center of FIG. 2B, surround a cutout window 46. The mounting region 38 of the load beam 34 is mounted to a top surface of the base plate 36 by welds 48. The base plate 36 is attached to the actuator arm 14 (shown in FIG. 2A) as discussed above. The two pre-load bend legs 40a, 40b flexibly couple the head suspension 42 to the mounting region 38. The two pre-load bend legs 40a, 40b accept a pre-load when the load beam 34 is placed into its intended operating position. This pre-load force tends to bias the head suspension 42 toward the disc 22. The head suspension 42 of the load beam 34 provides a relatively stiff element for mounting the flexure 18 and the slider 20 (as shown in FIG. 2A), which in turn carries the transducing head (not shown).

As shown in FIGS. 2A and 2B, the piezoelectric elements 32a, 32b are mounted using adhesive to the mounting tabs 43a, 43b of the mounting region 38 at one end and to the mounting steps 41a, 41b of the actuator arm 14 at the other end. Only a small portion of each end of the piezoelectric elements 32a, 32b is attached to the mounting region 38 and the actuator arm 14. The remainder of the lengths of the piezoelectric elements 32a, 32b remain unattached. The piezoelectric elements 32a, 32b, in a longitudinal direction, are disposed generally parallel to a longitudinal axis of the load beam 34. The piezoelectric elements 32a, 32b are generally configured such that they have a length exceeding a length of the mounting region 38 in a longitudinal direction. This configuration allows substantially longer piezoelectric elements 32a, 32b to be used. The piezoelectric elements 32a, 32b are longitudinally deformable (in the direction of the arrows shown in FIG. 2B) in response to a voltage applied across the elements. In other words, an applied voltage across the piezoelectric elements 32a, 32b causes the elements to expand or contract in a longitudinal direction. The voltage is applied using methods generally known to those of ordinary skill in the art such that an electric field is generated causing activation of the piezoelectric elements 32a, 32b. The piezoelectric elements 32a, 32b may be poled such that a positive voltage may cause either expansion or contraction.

In the present invention, the piezoelectric elements 32a, 32b are poled oppositely such that application of a positive voltage causes expansion of one element and contraction of the other element. Expansion and contraction of the piezoelectric elements 32a, 32b generates a torque in the head suspension 42, which tends to cause rotational motion of the head suspension 42 with respect to the mounting region 38. In the embodiment shown in FIG. 2A and FIG. 2B, however, rotational movement of the head suspension 42 will be minimal as the structural components allowing motion are not present.

An important aspect of the present invention is the use of the configuration in FIG. 2A and FIG. 2B for mounting the piezoelectric elements 32a, 32b to the load beam 34 and the actuator arm 14. The illustrated mounting technique allows for greater length piezoelectric elements 32a, 32b to be used. The amount of expansion or contraction along a longitudinal axis of the piezoelectric elements 32a, 32b is directly proportional to the lengths of those elements. Therefore, the piezoelectric elements 32a, 32b, which have a greater length than those previously employed in the prior art, allow for a greater range of motion of the head suspension 42 and the transducing head (not shown).

In the preferred embodiments, the piezoelectric elements 32a, 32b are constructed from a piezoelectric material. Piezoelectric materials are polable materials generally known in the art. In this first embodiment, the same polarity and magnitude of voltage is applied to each of the piezoelectric elements 32a, 32b. The amount of motion of the transducing head carried by the slider 20 is controlled by the magnitude and polarity of the voltage applied to the piezoelectric elements 32a, 32b of a specified length. Other similar materials could be used and would function in a similar manner as piezoelectric elements 32a, 32b. For example, any one of electroactive ceramics, electroactive polymers, and electrostrictive ceramic materials (collectively, electroactive materials or electroactive elements) could be used as piezoelectric elements 32a, 32b (as shown in FIG. 2A and FIG. 2B). It is also important to note that the present invention allows for the width's of the piezoelectric elements 32a, 32b to be varied. A wider width element, which may also be accomplished by employing multiple layers of elements, provides improved performance in many circumstances.

Figure 3:
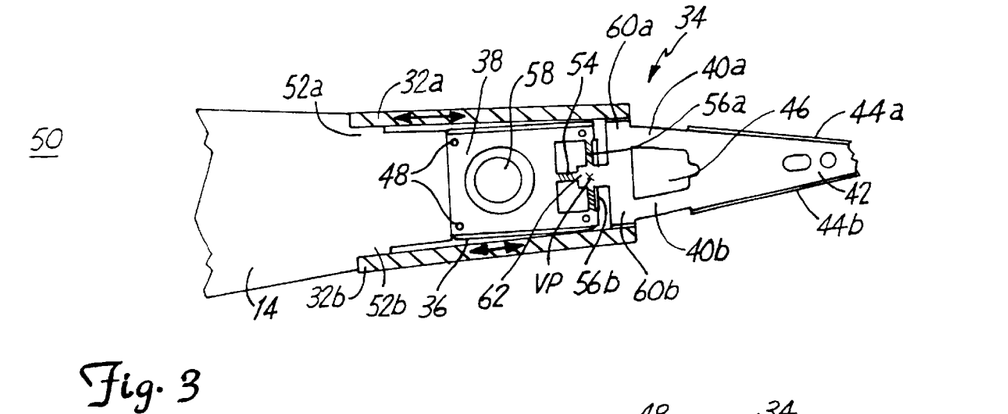
FIG. 3 is a top view of a microactuation system for use in a dual-stage disc drive actuation system for high resolution positioning of a slider according to a first embodiment of the present invention.

FIG. 3 shows a top view of a microactuation system 50 for use in a dual-stage disc drive actuation system for high resolution positioning of a transducing head (not shown) according to a first embodiment of the present invention. For purposes of illustration, the arm tip 37 of the actuator arm 14 has been omitted from FIG. 3. As shown from left to right in FIG. 3, the microactuation system 50 includes an actuator arm 14, two piezoelectric elements 32a, 32b, a base plate 36, and a load beam 34. The mounting region 38 of the load beam 34 is mounted to the base plate 36, and the two piezoelectric elements 32a, 32b are attached to the actuator arm 14 and the load beam 34 in a configuration normal to the plane of the load beam 34. The base plate 36 is commonly about the same general size as the mounting region 38, but it is shown larger in several of the figures for ease of illustration. The microactuation system 50 is located near the center of the disc drive actuation system 10, as shown in FIG. 1, and incorporates the actuator arm 14 and the suspension 16 shown in FIG. 1.

As shown in FIG. 3, moving from left to right, or from a proximal end to a distal end of the microactuation system 50, the actuator arm 14 includes steps 52a and 52b disposed symmetrically about and transverse to a longitudinal centerline of the actuator arm 14. The steps 52a, 52b are cut into each side of the actuator arm 14 and act to provide a mounting location for one end of the piezoelectric elements 32a, 32b. The load beam 34 includes a mounting region 38, a longitudinal microactuation beam 54, two microactuation hinges 56a, 56b, and a head suspension 42. The head suspension 42 is flexibly coupled to the mounting region 38 by the two microactuation hinges 56a, 56b and the longitudinal microactuation beam 54.

As best shown in FIG. 3, the two microactuation hinges 56a, 56b are disposed between the mounting region 38 and the head suspension 42 such that they are perpendicular to a longitudinal centerline of the load beam 34. The perpendicular configuration of the hinges 56a, 56b is intended to be exemplary only. The hinges 56a, 56b could be disposed at any of a numerous variety of angles. The longitudinal microactuation beam 54 shares a common longitudinal centerline with the head suspension 42. The longitudinal microactuation beam 54 could also be disposed at other angles with respect to the longitudinal centerline of the load beam 34. The microactuation hinges 56a, 56b and the longitudinal microactuation beam 54 flexibly couple the head suspension 42 to the mounting region 38. These components form the pivotal or rotational region of the load beam 34. These components bias the head suspension 42 to a position in the same plane as, and sharing a centerline with, the mounting region 38 while allowing movement with respect thereto upon application of a force having an appropriate magnitude and direction.

As shown in FIG. 3, the mounting region 38 of the load beam 34 is mounted to a top surface of the base plate 36 by welds 48. The base plate 36 is attached, commonly by a swage technique as described above, to the actuator arm 14. The head suspension 42 of the load beam 34 carries the flexure 18 and the slider 20 at a distal end (as shown in FIGS. 2A and 2B). The slider 20 carries the transducing head (not shown) for transducing data with the disc 22.

At a proximal end, near the center of the load beam 34 as shown in FIG. 3, the head suspension 42 has two pre-load bend legs 40a, 40b surrounding a cutout window 46. Located between the two pre-load bend legs 40a, 40b at the proximal end of the head suspension 42, and the slider 20, at the distal end of the head suspension 42, are two edge rails 44a, 44b. The edge rails 44a, 44b are located on transversely opposite sides of the head suspension 42 and provide stiffness to its central region. At a far left end, as shown in FIG. 3, the head suspension 42 has two piezoelectric mounting tabs 60a, 60b standing laterally outward from a longitudinal centerline of the head suspension 42 and a hinge mounting arm 62 extending toward the mounting region 38. The two microactuation hinges 56a, 56b and the longitudinal microactuation beam 54 attach to the hinge mounting arm 62 of the head suspension 42. As discussed in greater detail above, the mounting tabs 60a, 60b, in a preferred embodiment, are bent orthogonal to the general plane of the load beam 34.

The piezoelectric elements 32a, 32b are mounted using adhesive to the steps 52a, 52b, in the actuator arm 14 at one end and to the piezoelectric mounting tabs 60a, 60b, respectively, of the head suspension 42 at the other end. Only a small portion of each end of the piezoelectric elements 32a, 32b is attached to the actuator arm 14 and the head suspension 46. The remainder of the lengths of the piezoelectric elements 32a, 32b remain unattached. The piezoelectric elements 32a, 32b are disposed generally parallel to the longitudinal microactuation beam 54 and extend along the lateral edges of the mounting region 38 of the load beam 34. The piezoelectric elements 32a, 32b are configured such that they have a length exceeding the longitudinal length of the mounting region 38. This configuration allows substantially longer elements to be used, which, as discussed earlier, allows for a greater range of motion. The piezoelectric elements 32a, 32b are deformable longitudinally (in the direction of the arrows shown in FIG. 3) in response to an applied voltage across the elements. The voltage is applied by methods known to those of skill in the art such that an electric field is generated causing activation of the piezoelectric elements 32a, 32b. The piezoelectric elements 32a, 32b may be poled such that a positive voltage may cause either expansion or contraction.

In this particular embodiment, the piezoelectric elements 32a, 32b are poled oppositely such that application of a positive voltage causes expansion of one element and contraction of the other element. Expansion and contraction of the piezoelectric elements 32a, 32b generates a torque in the head suspension 42 thereby causing deformation of the microactuation hinges 56a, 56b and the longitudinal microactuation beam 54 and causing rotation of the head suspension 42 about a virtual pivot VP. The amount of torque generated in the head suspension 42 is determined by the force applied by the piezoelectric elements 32a, 32b multiplied by the longitudinal distance between the point of application of the force (mounting tabs 60a, 60b) and a virtual pivot VP. Rotation of the head suspension 42 about the virtual pivot VP causes motion of the slider 20 carrying the transducing head radially with respect to the disc 22. Thus, a controlled voltage applied to the piezoelectric elements 32a, 32b may be utilized to effect high resolution positioning of a transducing head carried by the slider 20 radially with respect to the disc 22. The amount of displacement is directly proportional to the length of the piezoelectric elements 32a, 32b employed.

Although the microactuation system 50 is shown in FIG. 3 as having two piezoelectric elements 32a, 32b, it could also be constructed using only one piezoelectric element 32. The use of only one piezoelectric element 32 results in both cost and space savings. Using only one piezoelectric element 32 requires that the single piezoelectric element 32 be able to produce the torque, previously produced by two elements, necessary for causing rotation of the head suspension 42. Also, the use of a single piezoelectric element 32 results in an asymmetric configuration. If necessary, this asymmetric configuration may be compensated for by changing the dimensions of the microactuation hinges 56a, 56b. One of the microactuation hinges 56a, 56b could be made shorter or wider than the other to decrease its compliance and thus the amount of deformation it experiences. Alternatively, one of the two pre-load bend legs 40a, 40b on the head suspension 42 could be made wider than the other. Either of these methods could be used to add symmetrical stiffness to the load beam 34.

Figure 4:
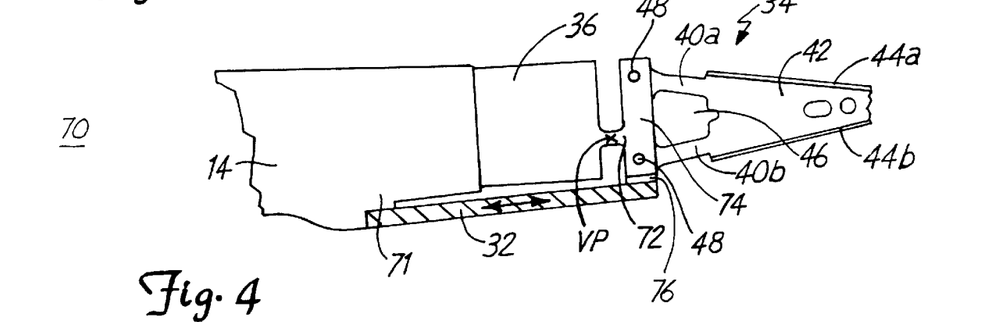
FIG. 4 is a bottom view of a microactuation system for use in a dual-stage disc drive actuation system for high resolution positioning of a slider according to a second embodiment of the present invention.

FIG. 4 is a bottom view of a microactuation system 70 used in a dual-stage disc drive actuation system for high resolution positioning of a transducing head (not shown) according to a second embodiment of the present invention. In this second embodiment, the microactuation system 70 includes, as shown from left to right, an actuator arm 14, a piezoelectric element 32, a base plate 36, and a load beam 34. The load beam 34 is attached to a top or bottom surface of the base plate 36 by welds 48. The base plate 36 is attached to the actuator arm 14, commonly by a swage process. The piezoelectric element 32 is attached to a surface of the actuator arm 14 and the base plate 36, in an orthogonal configuration, as explained in further detail below. The microactuation system 70 includes the actuator arm 14 and the suspension 16, as shown in FIG. 1.

As shown in FIG. 4, near the left side, the actuator arm 14 includes a step 71 cut into a lateral surface to provide a mounting point for one end of the piezoelectric element 32. As shown in FIG. 4, moving from left to right, or from a proximal end to a distal end, the base plate 36 includes a longitudinal microactuation hinge 72 and a head suspension mount 74. The longitudinal microactuation hinge 72 flexibly couples the head suspension mount 74 to the remainder of the base plate 36 and acts as the pivot structure. In a preferred embodiment, the longitudinal microactuation hinge 72 is disposed generally parallel to a longitudinal centerline of the head mounting region 38 and is disposed lateral to the longitudinal centerline in the direction toward the piezoelectric element 32. The longitudinal microactuation hinge, however, could effectively be placed at any point between the mounting region 38 and the head suspension mount 74. The length and width of the longitudinal microactuation hinge 72 can be varied to change the flexibility of the element. For instance, making the longitudinal microactuation hinge 72 shorter or wider will decrease its flexibility. The longitudinal microactuation hinge 72 biases the head suspension 42 to a position having a common centerline with the mounting region 38 while allowing motion of the head suspension 42 with respect to the mounting region 38 by application of a force having an appropriate magnitude and direction.

The load beam 34 is coupled to the head suspension mount 74. The load beam 34 includes two pre-load bend legs 40a, 40b, surrounding a cut-out window 46, and a head suspension 42. The head suspension 42 of the load beam 34 carries the flexure 18 and the slider 20 (as shown in FIGS. 2A and 2B). The slider 20 carries the transducing head (not shown) for transducing data with a disc 22. Located between the pre-load bend legs 40a, 40b, at the proximal end of the load beam 34, and the slider 20, at the distal end of the head suspension 42, are two edge rails 44a, 44b. The edge rails 44a, 44b are located on transversely opposite sides of the head suspension 42 and provide stiffness to its central region.

As shown in FIG. 4, the piezoelectric element 32 is mounted, generally using adhesive, to the step 71 of the actuator arm 14 and the mounting tab 76 located on the head suspension mount 74. As discussed above, the mounting tab 76 may extend directly outward from the suspension mount 74 or may be bent orthogonal to the plane of the suspension mount 74. The piezoelectric element 32 is disposed near a lateral edge of the actuator arm 14 and the load beam 34. As shown from left to right in FIG. 4, a first end of the piezoelectric element 32 is connected to the step 72 of the actuator arm 14, and a second end is connected to the mounting tab 76 located on the head suspension mount 74. As is also apparent from FIG. 4, the piezoelectric element 32 has a length that exceeds the length of the mounting region 38.

Like the piezoelectric elements 32a, 32b in the first embodiment of the present invention, the piezoelectric element 32 in the second embodiment of the present invention is deformable longitudinally in response to an applied voltage. The deformation occurs in the direction of the arrow located on the piezoelectric element 32, in FIG. 4. Expansion and contraction, in a longitudinal direction (as shown by the arrow in FIG. 4), of the piezoelectric element 32 generates a torque in the head suspension 42 which causes deformation of the longitudinal microactuation hinge 72 and causes rotation of the head suspension 42 about a virtual pivot VP. The amount of torque generated in the head suspension 42 is determined by the amount of force applied by the piezoelectric element 32 multiplied by the lateral distance between the point of application of the force and the virtual pivot VP. As shown in FIG. 4, the longitudinal microactuation hinge 72 is disposed lateral to a longitudinal centerline of the mounting region 38 toward the piezoelectric element 32. This causes the point of rotation about the virtual pivot VP to be closer to the point of application of the force generated by the piezoelectric element 32, which increases the amount of displacement of the head suspension 42.

Rotation of the head suspension 42 about the virtual pivot VP causes motion of the slider 20 carrying the transducing head radially with respect to the disc 22. Thus, during operation of the microactuation system 70, a control voltage is applied to the piezoelectric element 32 to effect high resolution positioning of the transducing head with respect to tracks 24 of the disc 22. The amount of displacement is directly proportional to the magnitude of voltage applied and the length of the piezoelectric element 32 employed.

The microactuation system 70, shown in FIG. 4, is similar to the microactuation system 30, shown in FIG. 2A and FIG. 2B, except that the hinge in FIG. 4 is part of the base plate 36 as opposed to the load beam 34. Although the microactuation system 70, shown in FIG. 4, uses only one piezoelectric element 32, it would be possible to mount a second piezoelectric element between the actuator arm 14 and the head suspension mount 74 on the opposite side. As discussed above, the use of two piezoelectric elements would increase the amount of torque generated and would minimize the problems associated with an asymmetric configuration.

Figure 5:
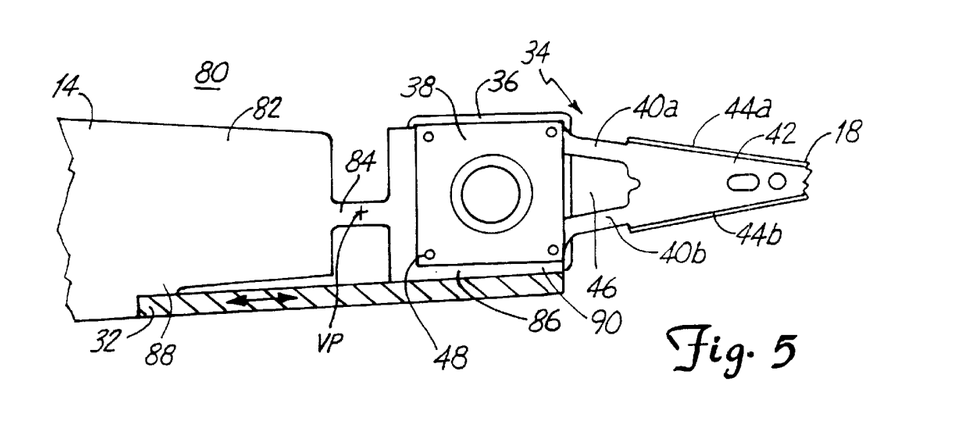
FIG. 5 is a top view of a microactuation system for use in a dual-stage disc drive actuation system for high resolution positioning of a slider according to a third embodiment of the present invention.

FIG. 5 is a top view of a microactuation system 80 for use in a dual-stage disc drive actuation system for high resolution positioning of a transducing head (not shown) according to a third embodiment of the present invention. For purposes of illustration, the arm tip 37 of the actuator arm 14 has been omitted from FIG. 5. As shown from left to right in FIG. 5, the microactuation system 80 includes an actuator arm 14, a piezoelectric element 32, a base plate 36, and a load beam 34. A mounting region 38 of the load beam 34 is attached to a top or bottom surface of the base plate 36 by welds 48, which is attached to the actuator arm 14. The piezoelectric element 32 is attached between two portions of the actuator arm 14, as explained in greater detail below, normal to the plane of the load beam 34.

As shown from left to right in FIG. 5, the actuator arm 14 includes a body 82, a longitudinal microactuation hinge 84, and a mounting arm 86. In a preferred embodiment, the longitudinal microactuation hinge 84 is disposed substantially along a centerline of the actuator arm 14 and flexibly couples the body 82 to the mounting arm 86. In other embodiments, however, the longitudinal microactuation hinge 84 could be placed lateral to the longitudinal centerline of the actuator arm 14. As the longitudinal microactuation hinge 84 moves closer to the piezoelectric element 32, it results in a greater amount of stroke. The body 82 of the actuator arm 14 has a step 88 cut into one side for attachment of one end of the piezoelectric element 32. The mounting arm 86 of the actuator arm 14 is L-shaped and includes a mounting tab 90 for securing a second end of the piezoelectric element 32. The mounting tab 90 is generally disposed near the farthest distal portion of the mounting arm 86 to maximize the effective length of the piezoelectric element 32. Again, the mounting tab 90, in a first preferred embodiment, is configured orthogonal to the plane of the load beam 34 and, in a second preferred embodiment, is configured parallel to the plane of the load beam 34.

As shown in FIG. 5, load beam 34 is essentially identical to those shown and described with reference to FIG. 2B above. The major distinction between microactuation system 80, shown in FIG. 5 and microactuation systems 50 and 70, shown in FIGS. 3 and 4, is that in the microactuation system 80, the hinge is part of the actuator arm 14. The piezoelectric element 32 is mounted, at one end, to the step 88 on the body 82 of the actuator arm 14 and at the other end to the mounting tab 90 on the mounting arm 86. As illustrated in FIG. 5, the piezoelectric element 32 has a length greater than the mounting region 38 of the load beam 34.

When the microactuation system 80 is in use, the piezoelectric element 32 may be activated to effect positioning of a transducing head on the slider 20 relative to the disc 22. The piezoelectric element 32 is constructed from the same material as that of the previously described embodiments. When a positive voltage is applied to the piezoelectric element 32, it expands (in the direction of the arrow shown in FIG. 5) and imparts a torque on the mounting arm 86 of the actuator arm 14 causing a rotation of the mounting arm 86, and thus the head suspension 42 of the load beam 34, about a virtual pivot VP. This rotation of the head suspension 42 causes movement of the slider 20 with respect to the disc 22.

The amount of torque experienced by the mounting arm 86 of the actuator arm 14 is determined by the magnitude of the force applied by the piezoelectric element 32 multiplied by the longitudinal distance between the point of attachment on the mounting arm 86 (shown as mounting tab 90 in FIG. 5) and the virtual pivot VP. When a negative voltage is applied to piezoelectric element 32, it contracts causing rotation of the head suspension 42 about the virtual pivot VP in an opposite direction. The polarity and magnitude of voltage applied to the piezoelectric element 32 controls the direction and amount of displacement of the transducing head (not shown) on the slider 20.

Like the microactuation system 70, shown in FIG. 4, the microactuation system 80, shown in FIG. 5, may also employ a second piezoelectric element. The second piezoelectric element would be mounted on an opposite side of the actuator arm 14 between the body 82 and the mounting arm 86. A second piezoelectric element would allow more torque to be generated and would result in a symmetric configuration.

Figure 6:
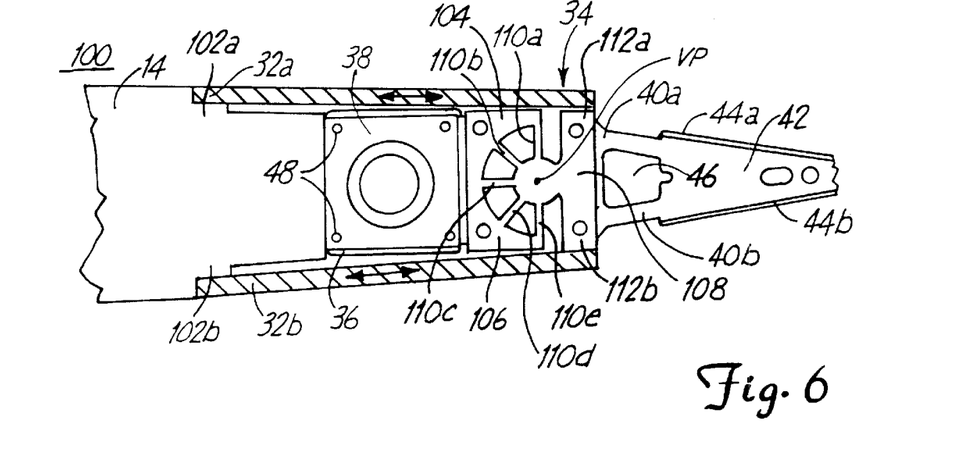
FIG. 6 is a top view of a microactuation system for use in a dual-stage disc drive actuation system for high resolution positioning of a slider according to a fourth embodiment of the present invention.

FIG. 6 is a top view of a microactuation system 100 for use in a dual stage disc drive actuation system for high resolution positioning of a transducing head (not shown) according to a fourth embodiment of the present invention. For purposes of illustration, the arm tip 37 of the actuator arm 14 has been omitted from FIG. 6. As shown from left to right in FIG. 6, the microactuation system 100 includes an actuator arm 14, two piezoelectric elements 32a, 32b, a base plate 36, and a load beam 34. A mounting region 38 of the load beam 34 is attached to a top or bottom surface of the base plate 36 by welds 48, which is attached to the actuator arm 14. The piezoelectric elements 32a, 32b are attached between the actuator arm 14 and the load beam 34, as explained in greater detail below, orthogonal to the plane of the load beam 34.

As shown in FIG. 6, the actuator arm 14 includes two steps 102a, 102b for attachment of a first end of the piezoelectric elements 32a, 32b. As shown from left to right in FIG. 6, the load beam 34 includes a mounting region 38, a hinge region 104, and a head suspension 42. The head suspension 42 is flexibly coupled to the mounting region 38 by the hinge region 104. The hinge region 104 may be constructed in any of a variety of configurations known to those of ordinary skill in the art. The hinge region 104, illustrated in FIG. 6, shows one possible configuration for this element.

As shown near the middle of FIG. 6, the hinge region 104 includes a body 106 and a mounting-arm 108. The body 106 of the hinge region 104 includes five microactuation beams 110a, 110b, 10c, 110d, 110e (moving in a counterclockwise direction around the mounting arm 108). The specific dimensions of the microactuation beams 110a, 110b, 110c, 10d, 110e may be manipulated depending on the level of flexibility desired between the head suspension 42 and the mounting region 38. In the embodiment disclosed in FIG. 6, the microactuation beams 110a, 110b, 110c, 110d, 110e are disposed in a semicircle about the mounting arm 108, spaced at approximately forty-five degree intervals. The microactuation beams 110a, 110b, 110c, 110d, 110e bias the head suspension 42 to a position having a common centerline with the mounting region 38, while allowing motion of the head suspension 42 with respect to the mounting region 38 upon application of a force having an appropriate magnitude and direction. The mounting arm 108 includes mounting tabs 112a, 112b, which provide a mounting surface for the piezoelectric elements 32a, 32b, respectively. Again, the mounting tabs 112a, 112b, in a first preferred embodiment, are disposed orthogonal to the general plane of the load beam 34 and, in a second preferred embodiment, are disposed parallel to the general plane of the load beam 34.

The piezoelectric elements 32a, 32b are mounted, generally using an adhesive, at a first end to the steps 102a, 102b of the actuator arm 14 and at a second end to the mounting tabs 112a, 112b of the mounting arm 108 of the hinge region 104. As shown in FIG. 6, the piezoelectric elements 32a, 32b have a length that exceeds the length of the mounting region 38, and are disposed on each lateral side of the mounting region 38. The piezoelectric elements 32a, 32b are disposed substantially parallel to a longitudinal centerline of the mounting region 38. As shown in FIG. 6, the head suspension 42 has generally the same configuration as that disclosed in FIG. 2B.

When the microactuation system 100 is in use, the piezoelectric elements 32a, 32b may be activated to effect positioning of a transducing head on the slider 20 relative to the disc 22, in the same manner as described with respect to the previous embodiments. The piezoelectric elements 32a, 32b are constructed from the same material as that of the previously described embodiments. When a voltage is applied to the piezoelectric elements 32a, 32b, they expand longitudinally (in the direction of the arrows shown in FIG. 6) and impart a torque on the hinge region 104 of the load beam 34 causing deflection of the microactuation beams 110a, 110b, 110c, 110d, 110e, and rotation of a mounting arm 108 with respect to the body 106 of the hinge region 104. This rotation, in turn, causes rotation of the head suspension 42 of the load beam 34 about a virtual pivot VP. This rotation of the head suspension 42 causes movement of the slider 20 with respect to the disc 22. The amount of torque experienced by the mounting arm 108 is determined by the magnitude of force applied by the piezoelectric elements 32a, 32b multiplied by the longitudinal distance between the point of attachment on the mounting arm 108 and the virtual pivot VP.

When the microactuation system 100 is placed in its intended operating position, a pre-load is applied to the head suspension 42 and is transmitted from the two pre-load bend legs 40a, 40b to the mounting arm and through the microactuation beams 110a, 110b, 110c, 110d, 110e, to the mounting region 38.

As shown in FIG. 6, the microactuation system 100 includes two piezoelectric elements 32a, 32b. It is also possible for the microactuation system 100 to employ only one piezoelectric element to effect displacement of the transducing head. In a configuration employing only one piezoelectric element, the device will be asymmetric with respect to a longitudinal axis. Various features of the load beam 34 may be modified to enhance symmetrical stiffness. For example, one of the two pre-load bend legs 40a, 40b could be widened to enhance stiffness, or one of the microactuation beams 110a, 110b, 110c, 110d, 110e could be modified to enhance symmetrical stiffness. Increasing the length of one of the microactuation beams 110a, 110b, 110c, 110d, 110e will increase its compliance in the general plane of the load beam 34 and decreasing the length will have an opposite effect. Also, the placement of the welds 48, bonding the mounting region 38 to the base plate 36, could be altered.

Figure 7A:
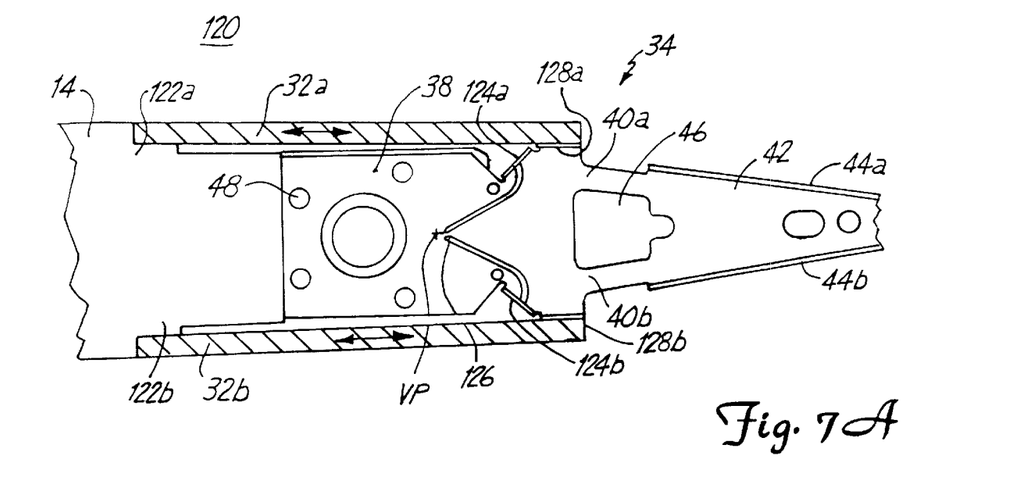
FIG. 7A is a top view of a microactuation system for use in a dual-stage disc drive actuation system for high resolution positioning of a slider according to a fifth embodiment of the present invention.

FIG. 7A is a top view of microactuation system 120 for use in a dual-stage disc drive actuation system for high resolution positioning of a transducing head (not shown) according a fifth embodiment of the present invention. For purposes of illustration, the arm tip 37 of the actuator arm 14 has been omitted from FIG. 7A. As shown for left to right in FIG. 7A, the microactuation system 120 includes an actuator arm 14, two piezoelectric elements 32a, 32b, a base plate 36, and load beam 34. The load beam 34 is attached to a top or bottom surface of the base plate 36 by welds 48, which is attached to the actuator arm 14. The piezoelectric elements 32a, 32b, are attached between a portion of the actuator arm 14 and a portion of the load beam 34, as explained in greater below, in a configuration generally orthogonal to the load beam 34.

As shown from left to right in FIG. 7A, the actuator arm 14 includes two steps 122a, 122b for attachment of a first end of the piezoelectric elements 32a, 32b. As shown from left to right in FIG. 7A, the load beam 34 includes a mounting region 38, two microactuation hinges 124a, 124b, a longitudinal microactuation beam 126, and a head suspension 42. The longitudinal microactuation beam 126 and the microactuation hinges 124a, 124b flexibly couple the mounting region 38 to the head suspension 42. In the preferred embodiment, the microactuation hinges 124a, 124b are disposed at an angle of approximately forty-five degrees from a longitudinal centerline of the head suspension 42. This angle, however, could be varied to alter the performance characteristics. The microactuation hinges 124a, 124b are generally formed from the same sheet as the head suspension 42. The microactuation hinges 124a, 124b are formed by bending an amount of material normal to the head suspension 42. The structural configuration of the microactuation hinges 124a, 124b normal to the head suspension 42 provides maximum stiffness of the head suspension in the dimension perpendicular to the plane of the head suspension 42 and disc 22, while minimizing stiffness in the plane of the head suspension 42. The lengths and widths of the microactuation hinges 124a, 124b and the longitudinal microactuation beam 126 may be varied to change the stiffness of the coupling between the mounting region 38 and the head suspension 42.

The head suspension 42 of the load beam 34 carries the flexure 18 and the slider 20 (as shown in FIGS. 2A and 2B). The slider 20 carries a transducing head (not shown) for writing data to and reading data from the disc 22. Near the center of the load beam 34, as shown in FIG. 7A, the head suspension 42 has two pre-load bend legs 40a, 40b surrounding cutout window 46. Located between the pre-load bend legs 40a, 40b, at the proximal end of the head suspension 42, and the slider 20, at the distal end of the head suspension 42, are two edge rails 44a, 44b. The edge rails 44a, 44b are located on transversely opposite sides of the head suspension 42 and provide stiffness to its central region.

As shown in FIG. 7A, the piezoelectric element 32a, 32b are mounted, generally using adhesive, to the steps 122a, 122b of the actuator arm and the mounting tabs 128a, 128b located on the head suspension 42. The mounting tabs 128a, 128b may be disposed, depending upon the desired configuration of the piezoelectric elements, either parallel to or orthogonal to the general plane of the load beam 34. The piezoelectric element 32a, 32b, are disposed near a lateral edge of the actuator arm 14 and the load beam 34. As shown from left to right in FIG. 7A, a first end of the piezoelectric element 32a is connected to the step 122a and the actuator arm 14 and a second end is connected to the mounting tab 128a located on the head suspension 42. As also shown in FIG. 7A, a first end of the piezoelectric element 32b, is connected to the step 122b of the actuator arm 14, and the second end is connected to the mounting tab 128b located on the head suspension 42. As is also apparent from FIG. 7A, the piezoelectric elements 32a, 32b have lengths that exceed the length of the mounting region 38.

When the microactuation system 120 is in use, the piezoelectric elements 32a, 32b may be activated to effect positioning of a transducing head on a slider 20 relate to the disc 22. The piezoelectric elements 32a, 32b are constructed from the same material of the previous described embodiments. When a voltage is applied to the piezoelectric elements 32a, 32b, they expand or contract (in the direction of the arrows shown in FIG. 7A) causing deformation of the microactuation hinges 124a, 124b and the longitudinal microactuation beam 126. This deformation causes rotation of the head suspension 42 about a virtual pivot VP. This rotation of the head suspension 42 causes movement of the slider 20 with respect to the disc 22. The amount of torque experienced by the head suspension 42 is determined by the magnitude of the force applied by the piezoelectric elements 32a, 32b multiplied by the longitudinal distance between the point of attachment on the mounting tabs 128a, 128b and the virtual pivot VP. Although the microactuation system 120, shown in FIG. 7A, uses two piezoelectric elements 32a, 32b it is possible to use only one piezoelectric element 32.

Figure 7B:
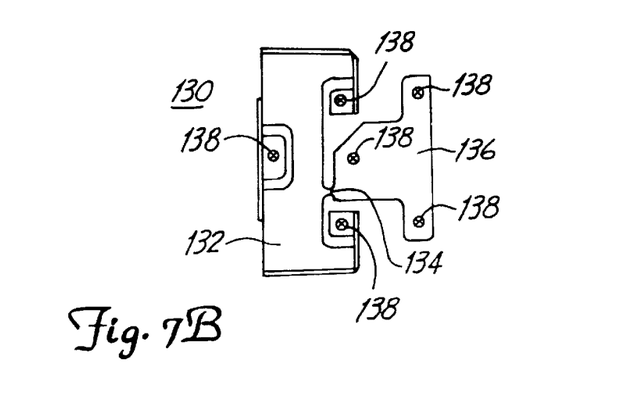
FIG. 7B is a top view of a leverage mechanism used in connection with the microactuation system shown in FIG. 7A.

FIG. 7B shows a top view of a leverage mechanism 130 according to the present invention. The leverage mechanism 130 may be used in combination with the microactuation system 120 shown in FIG. 7A. The leverage mechanism 130, explained in greater detail below, acts to move the line of action of the piezoelectric elements 32a, 32b closer to the virtual pivot VP, thereby increasing the leverage ratio and increasing the motion of the slider 20. As shown from left to right in FIG. 7B, the leverage mechanism 130 includes a stator 132, a longitudinal microactuation beam 134, and a rotor 136. The longitudinal microactuation beam 134 acts to flexibly couple the rotor 136 to the stator 132. In operation, the leverage mechanism 130 is placed on top of the microactuation system 120 shown in FIG. 7A. The stator 132 of the leverage mechanism 130 is fixed to the mounting region 38 of the load beam 34 by welds 138. The rotor 136 of the leverage mechanism 130 is fixed to the head suspension 42 by welds 138.

During operation of the microactuation system 120, including the leverage mechanism 130, the force applied by the piezoelectric elements 32a, 32b is transferred through the rotor 136 to the longitudinal microactuation beam 134. Using the leverage mechanism 130, the line of action of piezoelectric elements 32a, 32b is moved closer to the virtual pivot VP and thus the amount of motion of the head suspension 42 is increased. Increasing the motion of the head suspension 42 results in increased displacement of the head carried by the slider 20.

Figure 8:
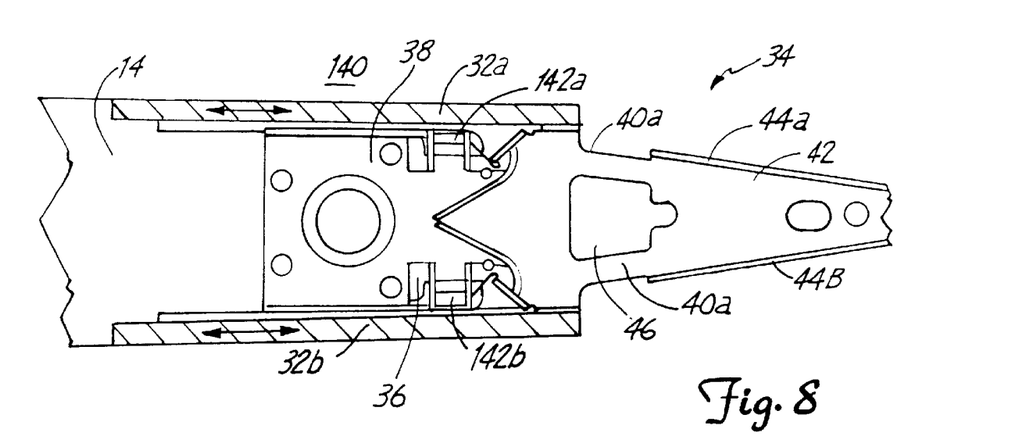
FIG. 8 is a top view of a piezoelectric support structure according to the present invention.

FIG. 8 shows a top view of a microactuation system 140 including supports 142a, 142b. Again, for purposes of illustration, the arm tip 37 of the actuator arm 14 has been omitted from FIG. 8. The supports 142a, 142b extend outward from the mounting region 38 and extend under piezoelectric elements 32a, 32b. The supports 142a, 142b support the weight of the piezoelectric elements 32a, 32b but are not fixedly coupled thereto. The supports 142a, 142b act to increase the stiffness of the microactuation structure which helps to optimize the pivot function.

Figure 9:
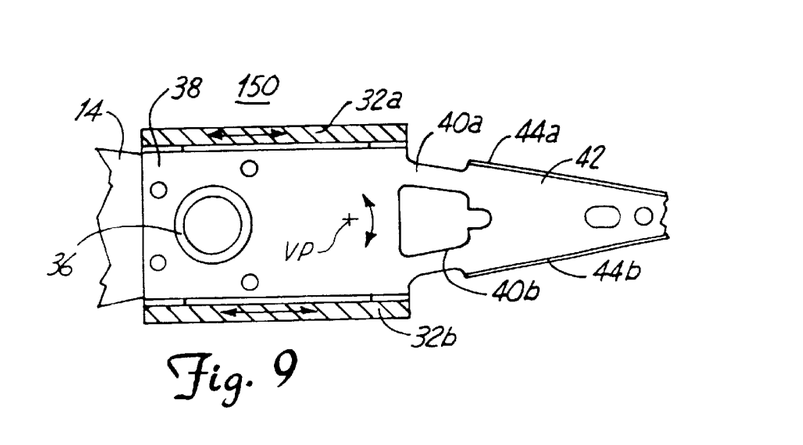
FIG. 9 is a top view of a microactuation system for use in dual-stage disc drive actuation system for high resolution positioning of a slider according a sixth embodiment of the present invention.

FIG. 9 shows a top view of microactuation system 150 for use in a dual-stage disc drive actuation system for high resolution positioning of a transducing head (not shown) according to a sixth embodiment of the present invention. Again, for purposes of illustration, the arm tip 37 of the actuator arm 14 has been omitted. FIG. 9 illustrates a generic embodiment of the present invention wherein the specific structures for allowing pivotal or rotational movement of the head suspension 42 with respect to the actuator arm 14 are not shown. The significance of the microactuation system 150, shown in FIG. 9, is the illustration of an alternative method for attaching the piezoelectric elements 32a, 32b. As in the previous embodiments, the piezoelectric elements 32a, 32b are disposed, in a first preferred embodiment, in a plane orthogonal to the load beam 34 and, in a second preferred embodiment, in a plane parallel to the load beam 34.

In the microactuation system 150, as shown in FIG. 9, piezoelectric elements 32a, 32b are attached between the mounting region 38 and the head suspension 42. In this embodiment the piezoelectric elements 32a, 32b are disposed substantially parallel to a lateral edge of the mounting region 38 and have a length exceeding the length of the: mounting region 38. The configuration of the piezoelectric elements 32a, 32b, shown in the microactuation system 150 of FIG. 9, could be applied to any of the microactuation system 50 shown in FIG. 3, microactuation system 70 shown in FIG. 4, the microactuation system 80 shown in FIG. 5, the microactuation system 100 shown in FIG. 6, the microactuation system 120 shown in FIG. 7A, or the microactuation system 140 shown in FIG. 8.

While the preferred embodiment of the present invention has been described in detail, it should be apparent that many modifications and variations to it are possible, all of which fall within the true spirit and scope of the present invention. For example, while the present invention is described as reading and writing data from rotating magnetic disc, the present invention is not intended to be limited in this respect. The transducing head in the recording surface may utilize magnetic, optical, or other data storage techniques to store data. Also, the various embodiments disclosed show various pivot structures in the load beam 34. It is important to note, however, that a multitude of alternative pivot structures could also be employed with the techniques of the present invention. The invention is not intended to be limited to the structures disclosed in the various preferred embodiments.

Although the present invention has been described with reference to preferred embodiments, workers skilled in the art will recognize that changes may be made in form and detail without departing from the spirit and scope of the invention.

What is claimed is:

1. A microactuator for selectively altering a position of a transducing head carried by a slider in a disc drive system with respect to a track of a rotatable disc having a plurality of concentric tracks, the microactuator having an actuator arm attached to a load beam for supporting the slider over the rotatable disc, the microactuator comprising:
   means for flexibly coupling a stationary region of the load beam to a moving region of the load beam; and
   means for selectively altering a position of the slider with respect to the rotatable disc, the means extending from the moving region to at least about a proximal end of the stationary region wherein the means has a length that exceeds a length of the stationary region.

2. A microactuator for selectively altering a position of a transducing head carried by a slider in a disc drive system with respect to a track of a rotatable disc having a plurality of concentric tracks, the microactuator having an actuator arm attached to a load beam, by a base plate, for supporting the slider over the rotatable disc, the microactuator having a stationary region and a moving region, the microactuator comprising:
   a first electroactive element attached to the stationary region at a first end and to the moving region at a second end, the first electroactive element being deformable in response to an electrical control signal applied thereto and having a length greater than the length of the base plate; and
   a first beam attached between the stationary region and the moving region, the first beam being flexible to permit movement of the slider with respect to the actuator arm generally about a virtual pivot.

3. The microactuator of claim 2 wherein the stationary region is located at a proximal end of the load beam and the moving region is located at a distal end of the load beam.

4. The microactuator of claim 2 wherein the stationary region is located at a distal end of the actuator arm and the moving region is located near a distal end of the base plate.

5. The microactuator of claim 2 wherein the first electroactive element is attached between about a proximal end of the stationary region and the moving region.

6. The microactuator of claim 2 wherein a width of the first electroactive element lies in a plane disposed generally orthogonal to a plane containing the stationary region.

7. The microactuator of claim 2 further comprising a leverage mechanism attached to the stationary region and the moving region to move the line of action of the first electroactive element closer to the virtual pivot.

8. A disc drive suspension comprising:
   an actuator arm having a proximal end and a distal end;
   a load beam attached to the distal end of the actuator arm, the load beam having a stationary region at a proximal end, a moving region near a distal end, and a flexible region between the stationary region and the moving region;
   a flexure connected to the distal end of the load beam, the flexure configured to receive and support a transducing head;
   the flexible region being flexible to permit movement of the moving region with respect to the stationary region in the general plane of the load beam; and
   a first electroactive element attached at a first end to the actuator arm and at a second end to the moving region, the first electroactive element being deformable in response to an electrical control signal applied thereto and having a length that exceeds the length of the stationary region of the load beam.

9. The disc drive suspension of claim 8 wherein the first electroactive element is attached between a proximal end of the stationary region of the load beam and the moving region of the load beam.

10. The disc drive suspension of claim 8 wherein a width of the first electroactive element lies in a plane disposed generally orthogonal to a plane containing the stationary region of the load beam.

11. The disc drive suspension of claim 8 wherein the flexible region includes a first beam connected between the stationary region and the moving region of the load beam, the first beam being disposed substantially along a longitudinal centerline of the load beam.

12. The disc drive suspension of claim 8 wherein the flexible region of the load beam includes at least one flexible hinge coupling the stationary region to the moving region of the load beam.

13. The disc drive suspension of claim 8 wherein the flexible region includes a plurality of beams, disposed in a semicircular manner at angles from one another of about 45 degrees, for coupling the stationary region to the moving region of the load beam.

14. The disc drive suspension of claim 8 wherein the electroactive element is constructed from a member of the group consisting of a piezoelectric material, an electroactive ceramic, an electroactive polymer, and an electrostrictive ceramic material.

15. The disc drive suspension of claim 8 wherein the flexible region includes a first and a second microactuation hinge attached between the stationary region and the moving region of the load beam, the first and second microactuation hinges being flexible to permit movement of the stationary region with respect to the moving region.

16. The disc drive suspension of claim 15 wherein the first and second microactuation hinges are bent normal to the general plane of the load beam to increase vertical stiffness and decrease lateral stiffness.

17. The disc drive suspension of claim 15 wherein the first microactuation hinge is shorter than the second microactuation hinge.

18. The disc drive suspension of claim 8 further comprising a second electroactive element attached between the actuator arm and the moving section of the load beam, the second electroactive element being deformable in a direction complimentary to deformation of the first electroactive element in response to an electrical control signal applied thereto.

19. The microactuator of claim 8 further comprising a leverage mechanism attached to the stationary region and the moving region to move the line of action of the first electroactive element closer to the virtual pivot.

* * * * *

UNITED STATES PATENT AND TRADEMARK OFFICE
CERTIFICATE OF CORRECTION

PATENT NO. : 6,515,834 B1
DATED : February 4, 2003
INVENTOR(S) : James Morgan Murphy It is certified that error appears in the above-identified patent and that said Letters Patent is hereby corrected as shown below:

<u>Column 2,</u>
Line 16, delete "bearn", insert -- beam --
Line 19, delete "bean", insert -- beam --

<u>Column 11,</u>
Line 27, delete "10c", insert -- 110c --
Line 30, delete "10d", insert -- 110d --

Signed and Sealed this

Eighteenth Day of November, 2003

JAMES E. ROGAN
*Director of the United States Patent and Trademark Office*